Oct. 5, 1937.  A. LÖWENSTEIN ET AL  2,094,996
SAWING MACHINE
Filed Nov. 9, 1935
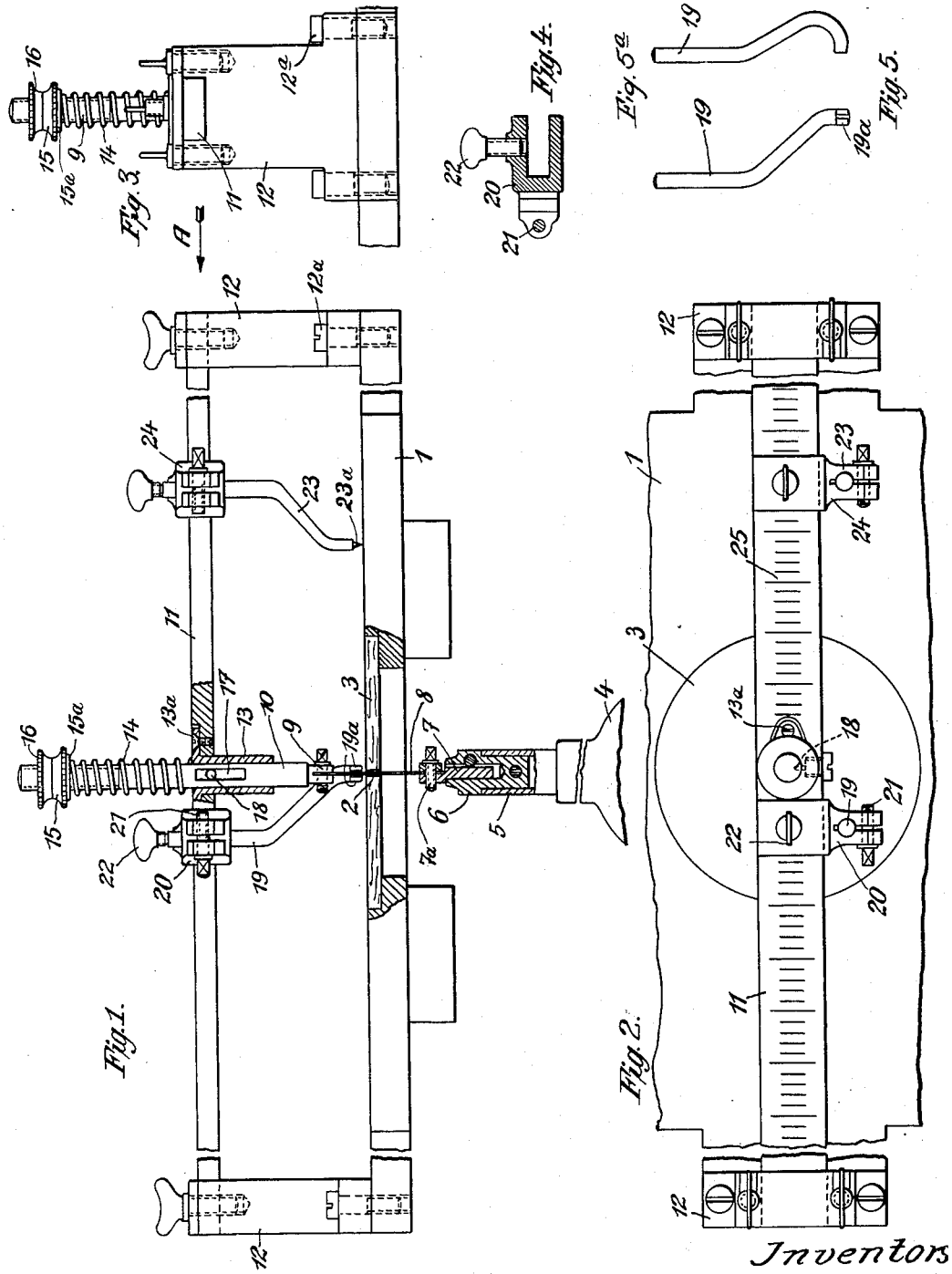
Inventors
Alfons Löwenstein
Fritz Hellinger
Atty. Alfred Werle

Patented Oct. 5, 1937

2,094,996

UNITED STATES PATENT OFFICE 2,094,996

SAWING MACHINE

Alfons Löwenstein and Fritz Hellinger, Berlin, Germany; said Hellinger assignor to said Löwenstein Application November 9, 1935, Serial No. 49,080
In Germany November 9, 1934

2 Claims. (Cl. 143—70)

Our invention relates to sawing machines and more particularly to high speed sawing machines. It is an object of our invention to provide an improved sawing machine adapted for sawing materials of any kind such as metal, wood, cork, leather, synthetic materials, etc.

In sawing machines known in the art the saw blade is held by means of movable holders the upper one of which is guided in a guiding member arranged at the free end of a bent support secured to the working table. Machines of this kind when operated at a high speed involve the drawback that the guiding member of the upper holder carries out oscillations up and down along a circular arc thereby imparting to the saw blade tilting movements so that alternatively at every stroke only the upper or lower portion of the blade is in cutting contact with the piece of work. In consequence thereof an additional guide for the blade must be arranged close to the upper surface of the piece of work. Besides this the vertical column of the bent support troubles the operator, for instance, in rotating an oblong piece of work.

It is an object of our invention to provide a sawing machine in which these drawbacks are avoided.

It is a further object of our invention to provide a high speed sawing machine of a simple and cheap construction.

A sawing machine according to our invention is particularly useful for sawing patterns such as dial plates from metal sheets, wood, artificial resin, bone, nacre, ivory or the like. It may be used, if desired, for sawing other materials such as fabric, cloth, leather, cork, rubber sponge, felt, etc.

In a sawing machine according to our invention a bridge-like oblong member is supported on the table at opposite sides of the saw blade, said member carrying the guide of the upper holder of the blade, a spring being provided the ends of which abut on said member and the upper free end of the upper holder, respectively. In this manner a tilting movement of the blade in its cutting plane is avoided, the forces tending to cause tilting oscillations of the blades compensating each other due to the arrangement of the guide of the upper holder on the bridge-like member supported on opposite sides of the blade. Thus the blade may carry out only vertical oscillations in its longitudinal direction, which are not disadvantageous but, on the contrary, improve the effect of the spring.

In the drawing affixed to this specification and forming part thereof some embodiments of our invention are illustrated diagrammatically by way of example.

In the drawing

Fig. 1 is a front elevation, partly in section of a sawing machine according to our invention.

Fig. 2 is a plan view of the machine shown in Fig. 1.

Fig. 3 is an end elevation of the machine shown in Fig. 1 taken in the direction of the arrow A.

Fig. 4 is an elevation, partly in section, of a member forming part of the machine shown in Fig. 1.

Figs. 5 and 5a are a front and a side elevation, respectively, of another member forming part of the machine shown in Fig. 1.

Referring now to the drawing, 1 is the working table provided with a plate 3, preferably of circular shape. The plate 3 is provided with a slot 2 or the like through which the saw blade extends. Below the plate 3 the driving motor 4 is arranged which imparts a reciprocating motion to the lower ram or holder 5. The upper portion of the holder 5 is hollow and carries an intermediate member 6 provided in its upper portion with a recess for the reception of a clamping member 7 to which the lower end of the blade 8 is secured by means of a screw 7a or the like. The upper end of the blade 8 is held in similar manner by an upper clamping member 9 carried by the upper holder 10, transverse to an oblong bar 11 removably secured at its ends to supports 12 secured to the table 1 by means of screws 12a or the like. 13 is a sleeve secured to the bar 11 for instance by means of screws 13a, said sleeve forming a guide for the holder 10. 14 is a helical spring surrounding the upper portion of the holder 10 and abutting with its lower end on the bar 11 and with its upper end on a nut 15 screwed on the threaded upper end of the holder 10. If desired, a washer 15a may be inserted between the nut 15 and the upper end of the spring 14. 16 is a counter-nut securing the nut 15 in position. The tension of the spring 14 may be adjusted by adjusting the nut 15. In order to protect the blade 8 against torsion the holder 10 is secured against rotation by suitable means such as a groove 17 provided in the holder 10 and a stationary pin 18 engaging said groove. Similar means (not shown) may be provided in connection with the holder 5.

Due to the fact that the bar 11 is detachably secured to the supports 12 the distance between the sleeve 13 and the table 1 may easily be increased by rotating the bar 11 about its longitudinal axis by 180° so that the sleeve 13 will project from the bar 11 in upward direction.

In order to dispense with a pressing of the piece of work (not shown) against the plate 3 by hand, a suitably bent presser arm 19 is provided having a bifurcated lower end 19a, as will be best seen from Figs. 5 and 5a, said arm holding down the piece of work, the blade 8 reciprocating in vertical direction between the side portions of the bifurcated end 19a of the arm. The upper end of the arm 19 is secured by means of a screw 21 to a slide 20 (Figs. 1, 2 and 4), which may be shifted along the bar 11 and secured in position by means of a screw 22.

In order to facilitate the cutting of circular articles from the piece of work, a suitably bent arm 23 is secured to a slider 24 shaped in similar manner as the slider 20, the lower end 23a of the arm 23 being pointed so as to secure by means of it in position the centre of the circular article to be cut. In order to facilitate the adjusting of the diameter of the article, the upper surface of the bar 11 is provided with a scale 25 along which the slide 24 may be shifted.

The operation of this device is as follows:

A piece of work is put on the plate 3. If a circular portion is to be cut from the piece of work, the arm 23 is set so as to engage with its pointed end 23a the piece of work at the centre of the circular portion to be cut. Then the motor 4 is started which drives the holder 5 and the blade 8 which will carry out a reciprocating movement in vertical direction. Due to the guiding of the upper holder 10 by means of the sleeve 13 secured to the bar 11 the blade 8 will reciprocate even at a high speed in an exactly vertical direction without tilting.

We wish it to be understood that we do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

We claim:—

1. In a jig saw machine, upper and lower chucks mounted to support a blade for rectilinear, reciprocating movement, an upper plunger supporting said upper chuck, and means for supporting said upper plunger, chuck and blade against lateral and edgewise deflection on the down stroke thereof, said means comprising a saw table, standards mounted on said saw table, a rigid bar extending across said table and supported by said standards, said plunger and chuck being mounted on said arm intermediate said standards.

2. A device, as claimed in claim 1 in which said standards and rigid bar are removably connected to said table and to each other.

ALFONS LÖWENSTEIN.
FRITZ HELLINGER.